June 24, 1941. J. T. HALAS 2,247,016
EGG OPENER
Filed July 28, 1938 2 Sheets-Sheet 1
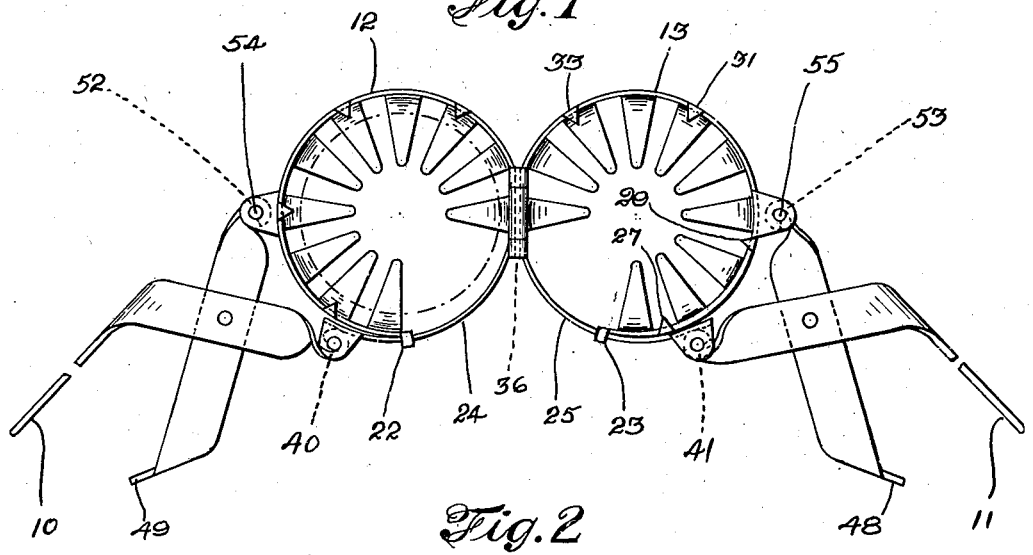
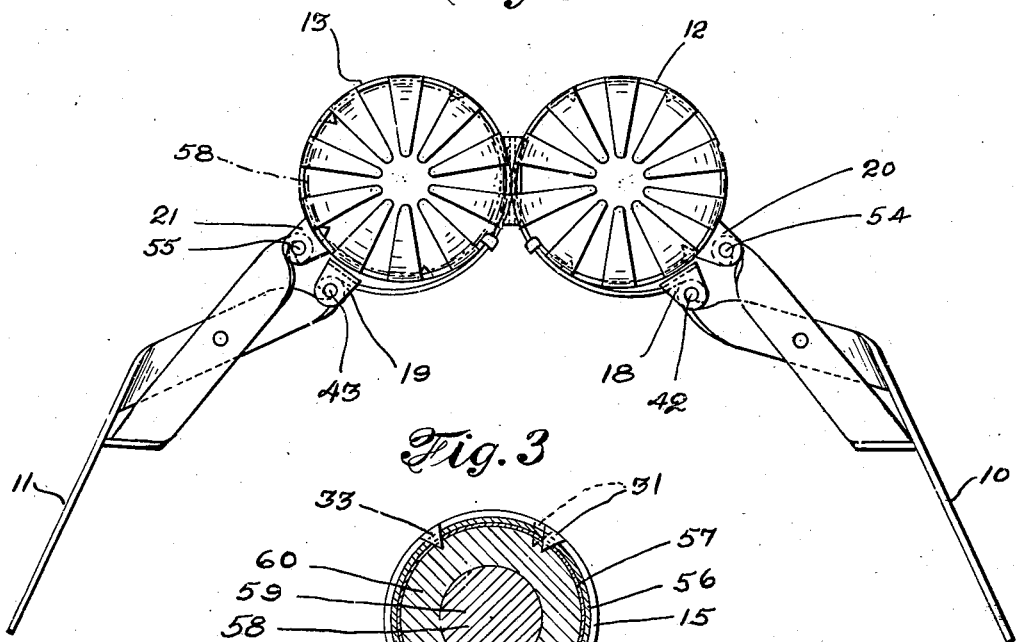
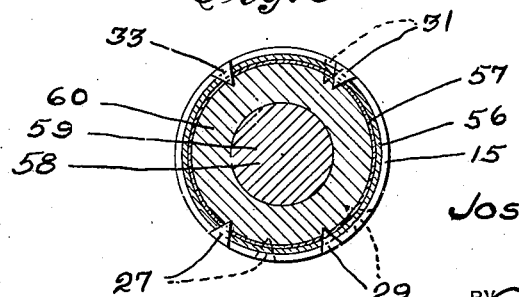
Joseph T. Halas
INVENTOR
ATTORNEY

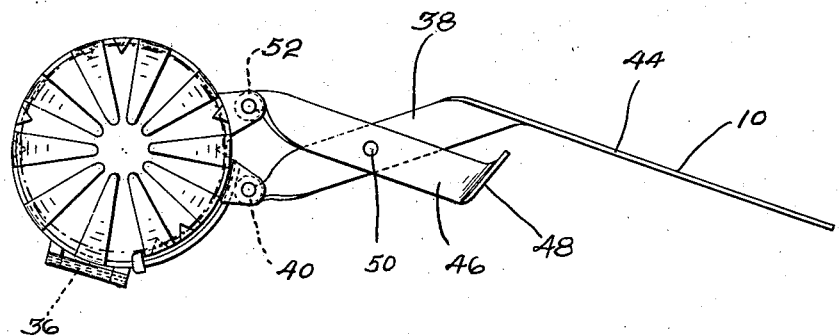
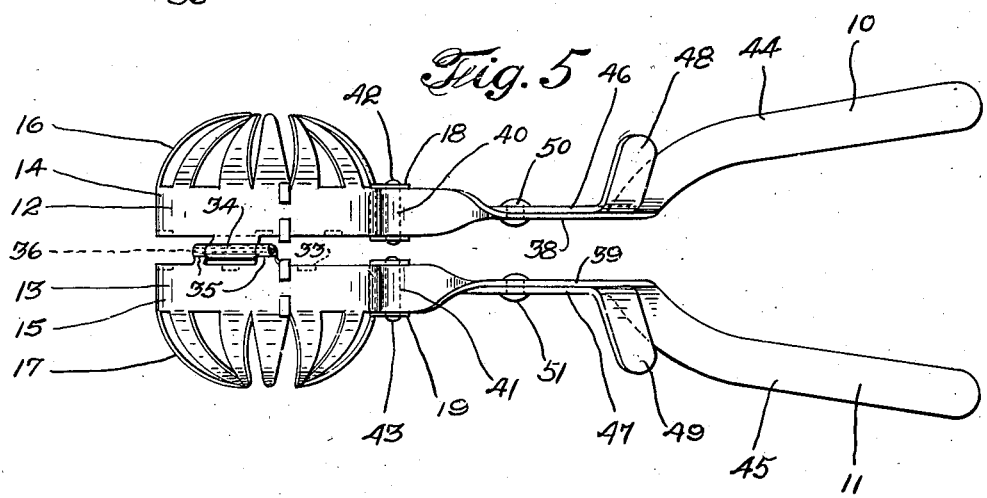
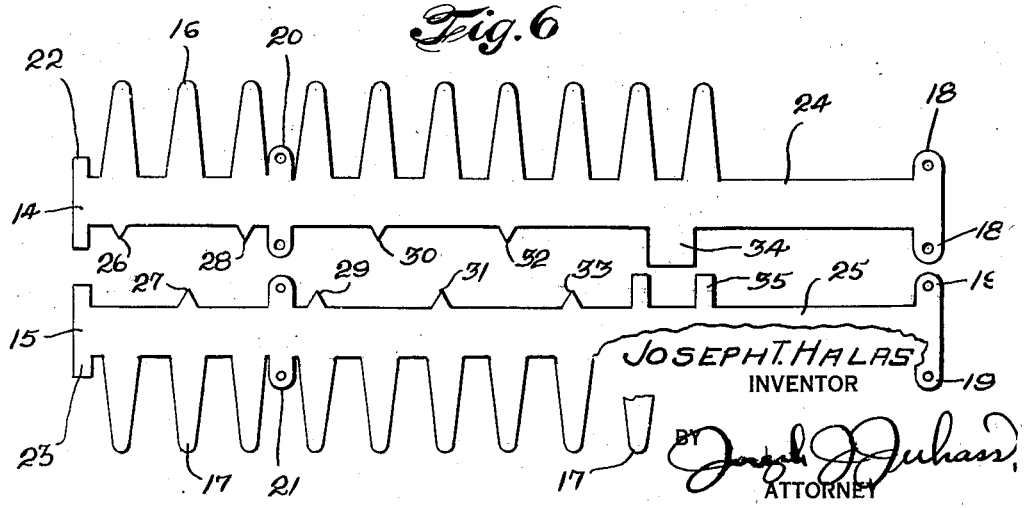

Patented June 24, 1941

2,247,016

UNITED STATES PATENT OFFICE 2,247,016

EGG OPENER

Joseph T. Halas, South Norwalk, Conn.

Application July 28, 1938, Serial No. 221,729

8 Claims. (Cl. 146—2)

This invention relates generally to devices for the opening of eggs and more particularly to an improved egg opening device which allows a simple, sanitary, and efficient cutting and breaking of the shell and the removal of the desired egg parts therefrom.

Among the objects of the present invention is the provision of structure which subjects the outer hard shell and the inner flexible shell to peripheral or circumferential cutting action, and simultaneously a radial cutting action.

Another object of the invention is the provision of an egg opening device comprising a plurality of receptacles being hinged together whereby upon a separation of the hinged receptacle portions the shell, both the hard outer shell and the flexible inner shell, will be split or torn in half so that the contents of the egg may drop from the shell portions, or by slightly opening the two portions of the receptacle, the white of the egg can be permitted to drop while the yolk is retained with the portions of the shell engaged by the receptacle portions.

The opening of eggs, especially raw eggs is frequently a difficult and messy operation and while attempts have been made in the prior art to effect this operation such devices have either been inefficient or inconvenient and unwieldy.

An important feature herein lies in the fact that the complete operation of placing the egg within the device, severing the shells, and removing the contents from the shells, is accomplished with a minimum of effort and with no unnecessary movements.

A further object of this invention is the provision of structure which may be readily manufactured on a quantity basis so that the same may be of low cost and available for mass distribution. All of the major parts may be constructed from sheet metal stamping, thereby reducing cost factors.

These objects, and further ends and advantages are more fully set forth in the progress of this disclosure and as pointed out in the appended claims.

In the accompanying drawings forming a material part of this disclosure, similar reference characters designate corresponding parts throughout the several views, in which:

Figure 1 is a plan view of a preferred embodiment of the invention shown in a completely open position and as seen looking into the cages thereof.

Figure 2 is a bottom plan view of the device as shown in Figure 1 with the cages in their contracted positions.

Figure 3 is a diagrammatical view showing the shell severing members as contracted and penetrating an egg which is shown in section.

Figure 4 is a view in side elevation of the device with the opposing cages brought together and in their contracted positions.

Figure 5 displays the device generally as the same would be seen from the bottom of Figure 4.

Figure 5 is a top plan view of the device with the opposing cages brought together and in the uncontracted positions thereof.

Figure 6 is a developed view partly broken away showing the blanks from which the two cages are formed, and other associated structure.

Turning now to Figure 5 this top plan view shows the device as it is preferably held by a right handed person who would, as standing at the right side of the drawing, grasp the handle 10 in his right hand and the left handle 11 in his left.

The cages indicated generally by numerals 12 and 13 are generally similar in construction and include bands 14 and 15; egg supporting fingers 16 and 17; upper orificed tabs 18 and 19; lower orificed tabs 20 and 21; and guide tabs 22 and 23. As viewed in Figure 6 the tabs 18 to 23 inclusive are bent up perpendicularly and the left ends of the bands 14 and 15 are brought downwardly and around so that the tabs 22 and 23 may be bent over the band portions 24 and 25. This operation forms two circular bands, the circumference of which may be varied by sliding the guide tabs 22 and 23 along the band portions 24 and 25. The egg support fingers 16 and 17 are bent to form the cages which have the hemi-spherical configuration as seen in the drawings. The cages are preferably stamped from stainless steel or other not easily corroded material. The inner longitudinal edges of the bands 14 and 15 are provided with a plurality of shell severing elements 26, 27, 28, 29, 30, 31, 32, and 33, the functions of which will be more fully described below. The bands 14 and 15 are further provided with integral hinge forming tabs 34 and 35. The last mentioned hinge forming tabs are preferably bent to form the knuckle portions of a hinge and the pivotal connection of these knuckles is secured by means of a hinge pin 36.

Each of the handles, 10 and 11, is preferably formed from a single irregularly shaped strip of relatively stiff metal. These handles 10 and 11 have their central portions 38 and 39 vertically disposed and the finger grasping portions 44 and 45 bent at right angles to the portions 38 and 39, and outwardly offset to allow sufficient room for the fingers of the hand to be wrapped thereabout. The inner ends of the handles 10 and 11 are given an opposite ninety degree twist and are bent upon themselves to form the knuckles 40 and 41. The knuckles 40 and 41 are pivotally secured to the orificed tabs 18 and 19, respectively, by means of pins 42 and 43.

The central portions 38 and 39 have pivotally attached thereto oppositely disposed thumb levers 46 and 47 and the outer ends thereof are preferably bent at right angles to the central portion thereof to form integral thumb pressure elements 48 and 49. The thumb levers 46 and 47 are secured in pivotal relation with central portions 38 and 39, preferably by means of rivets 50 and 51. The inner ends of the thumb levers 46 and 47 are oppositely bent at right angles and are also bent upon themselves to form knuckles 52 and 53, which are pivotally connected to orificed tabs 20 and 21 by pins 54 and 55.

It may be seen that manual movement of the thumb levers 46 and 47 about the rivets 50 and 51 will cause the knuckles 40 and 52, and 41 and 53 to move toward or away from each other causing a contraction or enlargement of the effective circumference of the bands 14 and 15. Such movement is graphically illustrated in Figures 1 and 2. Figure 1 shows the expanded position of the cages 14 and 15, while Figure 2 shows the cages in their most contracted position. Cages 14 and 15 are preferably of such size in their expanded positions that they will take the largest sizes of egg, while in a contracted position thereof these cages are of sufficient size to have shell severing elements penetrate both the outer shell 56 and the inner shell 57 of the egg 58 having a yolk portion 59 and a white portion 60.

It may be noted that in the contraction of the cages by the plier-like means described, the shell severing elements are not only moved inwardly of the egg 58, but are also simultaneously moved circumferentially. In Figure 3 this circumferential movement is illustrated schematically. The circumferential movement of the shell severing elements (33, 31, 29, and 27, as illustrated in Figure 3), occurs to a great extent in the said elements which are most remotely disposed from the hinge or tab 34 or conversely those elements nearest the guide tabs have the greatest movement. It may also be seen by a perusal of Figure 6 and Figure 4 that the shell severing elements are in staggering relation to each other on the free or inner edges of the bands 14 and 15. This spatial arrangement of the shell severing elements provides for a plurality of points at which both the outer shell 56 and the inner shell 57 are severed. Because of the brittleness of the outer shell, the shell severing elements crack the outer shell along a circumferential line about the middle of the egg. After the shell severing elements have penetrated the outer shell they puncture and cut the inner shell. Those portions of the egg shells which have not been separated by the actions just described are torn or broken along the same circumferential line when the two halves of the device, that is to say the two egg cages are separated about the axis, the pin 36.

A preferred method of operation is as follows: The handle 10 is grasped in the right hand with the thumb resting upon the thumb pressure element 48. The handle 10 is given a quick rotary flip away from the operator and the device will swing open, that is, the handle 11 will travel through an arc away from the user, thereby exposing the device to view as seen in Figure 1.

In this position an egg is placed into cage 12. The handle 11 is made to return through the same accurate path until the cage 13 is disposed opposite to the cage 12. In this position the device will appear as shown in Figure 5. The handle 11 is grasped in the left hand with the fingers of the left hand wrapped about the portion 45, and the thumb resting upon the element 49.

The two thumbs are moved downwardly a sufficient amount to break and sever the two shells as previously described. With the device above a container adapted to receive the contents of the egg shells, the two hands are moved away from each other traveling in an accurate path so that the cages likewise move away from each other pivotally. The contents of the egg will then drop down by force of gravity. If it is desired to separate the yolk from the white, it is only necessary for the cages to be slightly separated a sufficient amount whereupon the white will fall downwardly and the yolk will be retained with the two shell portions 57. After the contents of the egg have thus been removed, the shell may be released from the cages by releasing the thumb pressure elements 38 and 39. If the shell halves tend to remain in the cages they may be removed by giving the device a quick manual jerk.

Because of the fact that the shell severing elements do not at any time come into contact with the hands, it is possible to make these extremely sharp so that a very desirable cutting action may be obtained. Further, since the cages need not be handled the device as disclosed presents numerous sanitary advantages. Since the device is preferably constructed of non-corrosion material it is a simple matter to sterilize the same. It may thus be seen that I have provided a novel egg opening device which is extremely simple in construction, rapid in operation, sanitary and it may be manufactured at very low cost by reason of such novel construction.

The foregoing description has been made rather detailed for clearness of understanding only, and no unnecessary limitations should be understood therefrom, but the appended claims should be construed as broadly as permissible in view of the prior art.

I claim:

1. In an egg opener, a pair of cages having annular rims, said cages being movably associated with each other and adapted in an open position thereof to receive an egg and in a closed position thereof to enclose the egg and lever means to vary the circumference of the cages.

2. In an egg opener, a pair of cages having annular rims, said cages being movably associated with each other and adapted in an open position thereof to receive an egg and in a closed position thereof to enclose the egg, the rim of at least one of the cages being discontinuous thereby forming an overlapping portion, and means to move the free ends of said discontinuous rim circumferentially whereby the effective diameter or circumference thereof may be varied.

3. In an egg opener, a pair of cages having annular rims, said cages being movably associated with each other and adapted in an open position thereof to receive an egg and in a closed position thereof to enclose the egg, the rim of at least one of the cages being discontinuous to form an overlapping portion, and means to move the free ends of said discontinuous rim circumferentially whereby the effective diameter or circumference thereof may be varied, said means including a pair of levers.

4. In an egg opener, a cage adapted to support a portion of an egg and including a circumferentially arranged discontinuous flexible annular band having one end thereof overlapping the other end thereof and lever means to vary the circumference of said band, said band including a plurality of integral fingers projecting from one edge thereof and bent to form a cup-shape and a plurality of integral shell severing elements disposed on the other edge of said band.

5. In an egg opener, a pair of cages having annular rims, said cages being movably associated with each other and adapted in an open position thereof to receive an egg and in a closed position thereof to enclose the egg, the rim of at least one of the cages being discontinuous and forming overlapping portions, and means to move the free ends of said discontinuous rim circumferentially whereby the effective diameter or circumference thereof may be varied, said means including a pair of pivotally interconnected levers.

6. In an egg opener, a pair of cages having annular rims, said cages being movably associated with each other and adapted in an open position thereof to receive an egg and in a closed position thereof to enclose the egg, the rim of at least one of the cages being discontinuous and forming overlapping portions, and means to move the free ends of said discontinuous rim circumferentially whereby the effective diameter or circumference thereof may be varied, said means including a pair of pivotally interconnected levers, at least one of said levers being pivotally connected to said overlapping portion.

7. In an egg opener, a pair of cages having annular rims, said cages being movably associated with each other and adapted in an open position thereof to receive an egg and in a closed position thereof to enclose the egg, the rim of at least one of the cages being discontinuous and forming overlapping portions, and means to move the free ends of said discontinuous rim circumferentially whereby the effective diameter or circumference thereof may be varied, said means including a pair of pivotally interconnected levers, both of said levers being loosely connected to said rim.

8. In an egg opener: a pair of cages having annular rims, said cages being movably associated with each other and adapted in an open position thereof to receive an egg and in a closed position thereof to enclose the egg, the rim of at least one of the cages being discontinuous and forming overlapping portions, guide means on said rim for guiding movement of said overlapping portion; and means to move the free ends of said discontinuous rim circumferentially whereby the effective diameter or circumference thereof may be varied.

JOSEPH T. HALAS.